United States Patent [19]
Wittenbrink et al.

[11] Patent Number: 6,103,099
[45] Date of Patent: Aug. 15, 2000

[54] PRODUCTION OF SYNTHETIC LUBRICANT AND LUBRICANT BASE STOCK WITHOUT DEWAXING

[75] Inventors: Robert J. Wittenbrink; Daniel F. Ryan; Douglas R. Boate, all of Baton Rouge, La.

[73] Assignee: Exxon Research and Engineering Company, Florham Park, N.J.

[21] Appl. No.: 09/148,282

[22] Filed: Sep. 4, 1998

[51] Int. Cl.$^7$ .................................................. C10G 25/00
[52] U.S. Cl. ........................... 208/27; 585/734; 585/739; 585/737; 208/950; 208/112; 208/58; 208/130; 208/143; 518/700
[58] Field of Search ...................... 585/253, 734, 585/737, 739; 518/700; 208/27, 143, 950, 734, 138

[56] References Cited

U.S. PATENT DOCUMENTS 5,362,378  11/1994  Borghard et al. .................... 208/138
5,866,748   2/1999  Wittenbrink et al. ................ 208/138

FOREIGN PATENT DOCUMENTS 9920720  4/1999  WIPO .......................... C10M 143/08

*Primary Examiner*—Helane E. Myers
*Attorney, Agent, or Firm*—Jay Simon

[57] ABSTRACT

A lubricating base stock useful for forming lubricants such as a multigrade automotive oils, automatic transmission oils, greases and the like is prepared by hydroisomerizing a waxy hydrocarbon feed fraction having an initial boiling point in the 650–750° F. range and an end point of at least 1050° F., synthesized by a slurry Fischer-Tropsch hydrocarbon synthesis process. The hydroisomerization forms a hydroisomerate containing the desired base stock which is recovered, without dewaxing the hydroisomerate. The hydroisomerization is conducted at conditions effective to convert at least 67 wt. % of the 650–750° F.+ waxy feed hydrocarbons to lower boiling hydrocarbons. When combined with a standard lubricant additive package, these base stocks have been formed into multigrade automotive crankcase oils, transmission oils and hydraulic oils meeting the specifications for these oils.

25 Claims, No Drawings

PRODUCTION OF SYNTHETIC LUBRICANT AND LUBRICANT BASE STOCK WITHOUT DEWAXING

BACKGROUND OF THE DISCLOSURE

1. Field of the Invention

The invention relates to a process for producing a lubricant base stock from Fischer-Tropsch wax without a dewaxing step. More particularly the invention relates to producing a lubricant base stock from a Fischer-Tropsch synthesized, waxy hydrocarbon fraction, by hydroisomerizing a fraction having an initial boiling point in the range of 650–750° F.+ over a dual function catalyst comprising catalytic metal and acidic oxide components, to convert at least 60 wt. % of the 650–750° F.+ fraction to lower boiling material, and to a fully formulated lubricant comprising an admixture of the base stock and at least one lubricant additive.

2. Background of the Invention

Lubricating oils of low pour point are achieved from petroleum derived feeds such as distillate fractions and slack wax by hydrotreating, solvent extraction and either solvent or catalytic dewaxing. Due to increasing demands on lubricating oil performance and dwindling oil reserves of high quality, the production of synthetic lubricating oils from Fischer-Tropsch synthesized hydrocarbons has received increasing attention, particularly in view of the relatively large amounts of natural gas reserves which need to be converted into more valuable liquid products at the gas well sites and the relatively high purity and highly paraffinic nature of the synthesized hydrocarbons. All of the processes so far suggested for making a lubricant base stock from waxy Fischer-Tropsch synthesized hydrocarbons employ a catalytic or solvent dewaxing step. For example, U.S. Pat. No. 4,963,672 discloses a process comprising hydrotreating, hydroisomerizing and solvent dewaxing Fischer-Tropsch waxy hydrocarbons to produce a high VI and low pour point lube oil base stock. U.S. Pat. No. 5,059,299 discloses hydroisomerizing a Fischer-Tropsch wax and then solvent dewaxing the isomerate to produce a high viscosity index and low pour point lube oil base stock. EP 0 668 342 A1 and EP 0 776 959 A2 disclose hydroconverting a Fischer-Tropsch waxy feed and either catalytically or solvent dewaxing the hydroconvertate. It would be desirable to be able to produce a satisfactory lubricant base stock from Fischer-Tropsch wax without a dewaxing step.

SUMMARY OF THE INVENTION

The invention relates to a process for producing a high viscosity index lubricant base stock which does not include dewaxing, which comprises hydroisomerizing waxy Fischer-Tropsch synthesized hydrocarbons boiling within the lubricating oil range, at a high conversion level of at least 60 wt. %, preferably at least 67 wt. %, and more preferably at least 80 wt. % and recovering the hydroisomerate boiling within the lubricating oil range as a base stock. By waxy is meant material that solidifies at standard conditions of room temperature and pressure. By hydrocarbons boiling within the lubricating oil range is meant hydrocarbons having an initial boiling point in the range of 650–750° F. (650–750° F.+), an end point of preferably at least 1050° F., more preferably above 1050° F., and which preferably continuously boils from its initial boiling point to its end point. Fischer-Tropsch synthesized hydrocarbons comprising these waxy hydrocarbons boiling within the lubricating oil range will hereinafter be referred to as "waxy feed". The extent of conversion refers to the wt. % of the 650–750° F.+ hydrocarbons present in the waxy feed converted to lower boiling hydrocarbons, having an initial boiling point below the 650–750° F.+ boiling range (650–750° F.–). The actual cut point between 650–750° F. and also the end boiling point are determined by the practitioner and the process variables. That portion of the hydroisomerate having an initial 650–750° F. boiling point comprises the base stock of the invention. The lower boiling, 650–750° F.– material produced by the hydroisomerization is separated from the desired 650–750° F.+ base stock material, either by flashing or distilling the hydroisomerate. The resulting 650–750° F.+ base stock may be used as a wide-cut base stock or it may be cut into narrower boiling fractions by vacuum distillation, to obtain base stocks of different viscosities. Although the base stock of itself may not meet pour point and cold cranking performance requirements of an internal combustion engine crankcase lubricating oil, it has unexpectedly been found that when the base stock of the invention is combined with a standard lubricant additive package, such as a multigrade automotive crankcase oil additive package, the resulting fully formulated lubricating oil (hereinafter "lubricating oil" or "lube oil") will meet these requirements. Thus, in another embodiment the invention relates to a lubricant or lubricating oil formed from the base stock produced by the process of the invention. Because the base stocks of the invention and lubricating oils based on these base stocks are different, and most often superior to, lubricants formed from other base stocks, it will be obvious to the practitioner that a blend of another base stock with at least 20, preferably at least 40 and more preferably at least 60 wt. % of the base stock of the invention, will still provide superior properties in many most cases, although to a lesser degree than only if the base stock of the invention is used.

Thus, the process comprises hydroisomerizing a waxy Fischer-Tropsch synthesized feed comprising 650–750° F.+ hydrocarbons, by reacting it with hydrogen in the presence of a hydroisomerization catalyst, at a 650–750° F.+ hydrocarbon feed conversion level sufficient to produce a base stock which, when combined with lubricant additives, will meet the desired pour point and cold cranking requirements for a multigrade, internal combustion engine (e.g., automotive and diesel) crankcase oil. As mentioned above, the base stock is recovered by separating lower boiling material from the desired 650–750° F.+ hydroisomerate, which may or may not be further fractionated into fractions of different viscosity by vacuum distillation. The hydroisomerization catalyst is preferably a dual function catalyst comprising at least one catalytically active metal component and an acidic metal oxide component to give the catalyst both a (de) hydrogenation/hydrogenation function and an acid cracking function. In the practice of the invention it is preferred that a slurry Fischer-Tropsch hydrocarbon synthesis process be used for synthesizing the waxy feed and particularly one employing a Fischer-Tropsch catalyst comprising a catalytic cobalt component, to provide a high alpha for producing the more desirable higher molecular weight paraffins. These processes are also well known to those skilled in the art. An essential feature of the process of the invention is that the recovered 650–750° F.+ hydroisomerate is not dewaxed. The waxy feed for the hydroisomerization may contain hydrocarbons having an initial boiling point below the 650–750° F. range. However, the hydroisomerization converts a portion of the feed to lower boiling material. Hence, while the waxy feed can include lower boiling material, this lower boiling material will not produce a lube oil hydroisomerate having an initial boiling point in the range of from 650–750° F. Hence, if the hydroisomerization unit is intended primarily for lubricant base stock production, it is preferred to maximize the amount of 650–750° F.+ boiling material in the waxy feed to be hydroisomerized, in order to maximize the yield of useful lubricant base stock. On the other hand, if the hydroisomerization unit is intended for both fuels and lubricant base stock production, then the waxy feed will contain more lower boiling hydrocarbons. The base stocks of the invention are premium synthetic lubricating oil base stocks of high purity having a high VI and a low pour point. The base stocks of the invention and those comprising PAO oil differ from oil derived from petroleum oil or slack wax in an essentially nil heteroatom compound content and are isoparaffinic, in that they comprise at least 95 wt. % of non-cyclic isoparaffins. However, a PAO base stock comprises essentially star-shaped molecules with long branches, but the base stock of the invention does not comprise essentially star-shaped molecules with long branches. The base stock of the invention is superior to conventional mineral oils and equivalent to PAO (polyalphaolefin oil) in nearly all areas of performance except pour point. However, it has been found that a fully formulated lubricating oil, including multi-grade oils such as (a) an internal combustion engine crankcase oil, (b) an automatic transmission oil, and (c) a hydraulic oil, comprising a base stock of the invention, to which a standard additive package has been added, will possess an acceptable low temperature pour point. Thus, in this embodiment the invention comprises a fully formulated lubricating oil comprising a base stock of the invention in admixture with, or to which has been added, an additive package containing one or more additives, including a pour point depressant or a material which functions as a pour point depressant, to achieve the desired low pour point properties in the lubricating oil. In addition to a pour point depressing additive, a typical additive package will also include at least a VI improver or viscosity modifier, a detergent, an antiwear additive, a dispersant, an antioxidant and an antifoamant.

DETAILED DESCRIPTION

As set forth above, during hydroisomerization of the waxy feed, at least 60 wt. %, preferably at least 67 wt. % and more preferably at least 80 wt. % of the 650–750° F.+ hydrocarbons in the waxy feed are converted to 650–750° F.– hydrocarbons, based on a once through pass of the feed through the hydroisomerization reaction zone. The 650–750° F.+ hydroisomerate is separated from the 650–750° F.– hydrocarbons by fractionation or flashing to recover the 650–750° F.+ boiling hydroisomerate as a lubricant base stock. Any olefins and oxygenates present in the feed are hydrogenated during the hydroisomerization. The separated lower boiling material may be used for fuel boiling in the naphtha and diesel fuel ranges, if desired and the base stock fraction further fractionated by vacuum distillation into narrower fractions of different viscosity. The temperature and pressure in the hydroisomerization reactor will typically range from 300–900° F. (149–482° C.) and 300–2500 psig, with preferred ranges of 550–750° F. (288–400° C.) and 300–1200 psig, respectively. Hydrogen treat rates may range from 500 to 5000 SCF/B, with a preferred range of 2000–4000 SCF/B. The hydroisomerization catalyst comprises one or more Group VIII catalytic metal components, and preferably non-noble catalytic metal component(s), and an acidic metal oxide component to give the catalyst both a hydrogenation/dehydrogenation function and an acid hydrocracking function for hydroisomerizing the hydrocarbons. The catalyst may also have one or more Group VIB metal oxide promoters and one or more Group IB metals as a hydrocracking suppressant. In a preferred embodiment the catalytically active metal comprises cobalt and molybdenum. In a more preferred embodiment the catalyst will also contain a copper component to reduce hydrogenolysis. The acidic oxide component or carrier may include, alumina, silica-alumina, silica-alumina-phosphates, titania, zirconia, vanadia, and other Group II IV, V or VI oxides, as well as various molecular sieves, such as X, Y and Beta sieves. The elemental Groups referred to herein are those found in the Sargent-Welch Periodic Table of the Elements, ©1968. It is preferred that the acidic metal oxide component include silica-alumina and particularly amorphous silica-alumina in which the silica concentration in the bulk support (as opposed to surface silica) is less than about 50 wt. % and preferably less than 35 wt. %. A particularly preferred acidic oxide component comprises amorphous silica-alumina in which the silica content ranges from 10–30 wt. %. Additional components such as silica, clays and other materials as binders may also be used. The surface area of the catalyst is in the range of from about 180–400 $m^2/g$, preferably 230–350 $m^2/g$, with a respective pore volume, bulk density and side crushing strength in the ranges of 0.3 to 1.0 mL/g and preferably 0.35–0.75 mL/g; 0.5–1.0 g/mL, and 0.8–3.5 kg/mm. A particularly preferred hydroisomerization catalyst comprises cobalt, molybdenum and, optionally, copper, together with an amorphous silica-alumina component containing about 20–30 wt. % silica. The preparation of such catalysts is well known and documented. Illustrative, but non-limiting examples of the preparation and use of catalysts of this type may be found, for example, in U.S. Pat. Nos. 5,370,788 and 5,378,348. As was stated above, the hydroisomerization catalyst is most preferably one that is resistant to deactivation and to changes in its selectivity to isoparaffin formation. It has been found that the selectivity of many otherwise useful hydroisomerization catalysts will be changed and that the catalysts will also deactivate too quickly in the presence of sulfur and nitrogen compounds, and also oxygenates, even at the levels of these materials in the waxy feed. One such example comprises platinum or other noble metal on halogenated aluimina, such as fluorided alumina, from which the fluorine is stripped by the presence of oxygenates in the waxy feed. A hydroisomerization catalyst that is particularly preferred in the practice of the invention comprises a composite of both cobalt and molybdenum catalytic components and an amorphous alumina-silica component, and most preferably one in which the cobalt component is deposited on the amorphous silica-alumina and calcined before the molybdenum component is added. This catalyst will contain from 10–20 wt. % $MoO_3$ and 2–5 wt. % CoO on an amorphous alumina-silica support component in which the silica content ranges from 10–30 wt. % and preferably 20–30 wt. % of this support component. This catalyst has been found to have good selectivity retention and resistance to deactivation by oxygenates, sulfur and nitrogen compounds found in the Fischer-Tropsch produced waxy feeds. The preparation of this catalyst is disclosed in U.S. Pat. Nos. 5,756,420 and 5,750,819, the disclosures of which are incorporated herein by reference. It is still flrther preferred that this catalyst also contain a Group IB metal component for reducing hydrogenolysis.

A lubricant, which includes a grease and a fully formulated lubricating oil (hereinafter "lube oil"), is prepared by adding to, or admixing with the base stock, an effective amount of at least one additive or, more typically, an additive package containing more than one additive, wherein the additive is at least one of a detergent, a dispersant, an antioxidant, an antiwear additive, a pour point depressant, a VI improver, a friction modifier, a demulsifier, an antifoamant, a corrosion inhibitor, and a seal swell control additive. Of these, those additives common to most formulated lubricating oils include a detergent, a dispersant, an antioxidant, an antiwear additive and a VI improver or modifier, with the others being optional depending on the intended use of the oil. For example, most of the other additives, including a pour point depressant or a material which acts as a pour point depressant, are typically added to multigrade internal combustion engine oils. An effective amount of one or more additives or an additive package containing one or more such additives is added to or blended with the base stock to meet one or more specifications, such as those relating to a lubricant or lube oil for an internal combustion engine crankcase, an automatic transmission oil, a turbine or jet oil, a hydraulic oil, etc., as is known. Various manufacturers sell such additive packages for adding to a base stock or to a blend of base stocks to form fully formulated lube oils for meeting performance specifications required for different applications or intended uses, and the exact identity of the various additives present in an additive pack is typically maintained as a trade secret by the manufacturer. However, the chemical nature of the various additives is known to those skilled in the art. For example, alkali metal sulfonates and phenates are well known detergents, with PIBSA (polyisobutylene succinic anhydride) and PIBSA-PAM (polyisobutylene succinic anhydride amine) with or without being borated being well known and used dispersants. VI improvers and pour point depressants include acrylic polymers and copolymers such as polymethacrylates, polyalkylmethacrylates, as well as olefin copolymers, copolymers of vinyl acetate and ethylene, dialkyl fumarate and vinyl acetate, and others which are known. The most widely used antiwear additives are metal dialkyldithiophosphates such as ZDDP in which the metal is zinc, metal carbamates and dithiocarbamates, ashless types which include ethoxylated amine dialkyldithiophosphates and dithiobenzoates. Friction modifiers include glycol esters and ether amines. Benzotriazole is a widely used corrosion inhibitor, while silicones are well known antifoamants. Antioxidants include hindered phenols and hindered aromatic amines such as 2,6-di-tert-butyl-4-n-butyl phenol and diphenyl amine, with copper compounds such as copper oleates and copper-PIBSA being well known. This is meant to be an illustrative, but nonlimiting list of the various additives used in lube oils. Thus, additive packages can and often do contain many different chemical types of additives and the performance of the base stock of the invention with a particular additive or additive package can not be predicted a priori. That its performance differs from that of conventional and PAO oils with the same level of the same additives, is itself proof of the chemistry of the base stock of the invention being different from that of prior art base stocks. In many cases it will be advantageous to employ only a base stock of the invention derived from waxy Fischer-Tropsch hydrocarbons for a particular lubricant, while in other cases, one or more additional base stocks may be mixed with, added to or blended with one or more of the base stocks of the invention. Such additional base stocks may be selected from the group consisting of (i) a hydrocarbonaceous base stock, (ii) a synthetic base stock and mixture thereof. By hydrocarbonaceous is meant a primarily hydrocarbon type base stock derived from a conventional mineral oil, shale oil, tar, coal liquefaction, and mineral oil derived slack wax, while a synthetic base stock will include a PAO, polyester types and other synthetics.

In a Fischer-Tropsch hydrocarbon synthesis process, a synthesis gas comprising a mixture of $H_2$ and CO is catalytically converted into hydrocarbons and preferably liquid hydrocarbons. The mole ratio of the hydrogen to the carbon monoxide may broadly range from about 0.5 to 4, but which is more typically within the range of from about 0.7 to 2.75 and preferably from about 0.7 to 2.5. As is well known, Fischer-Tropsch hydrocarbon synthesis processes include processes in which the catalyst is in the form of a fixed bed, a fluidized bed and as a slurry of catalyst particles in a hydrocarbon slurry liquid. The stoichiometric mole ratio for a Fischer-Tropsch hydrocarbon synthesis reaction is 2.0, but there are many reasons for using other than a stoichiometric ratio as those skilled in the art know, and a discussion of which is beyond the scope of the present invention. In the preferred slurry hydrocarbon synthesis process, the mole ratio of the $H_2$ to CO is typically about 2.1/1. The synthesis gas comprising a mixture of $H_2$ and CO is bubbled up into the bottom of the slurry and reacts in the presence of the particulate Fischer-Tropsch hydrocarbon synthesis catalyst in the slurry liquid, at conditions effective to form hydrocarbons, at least a portion of which are liquid at the reaction conditions and which comprise the hydrocarbon slurry liquid. The synthesized hydrocarbon liquid is typically separated from the catalyst particles as filtrate by means such as simple filtration, although other separation means such as centrifugation can be used. Some of the synthesized hydrocarbons are vapor and pass out the top of the hydrocarbon synthesis reactor, along with unreacted synthesis gas and gaseous reaction products. Some of these overhead hydrocarbon vapors are typically condensed to liquid and combined with the hydrocarbon liquid filtrate. Thus, the initial boiling point of the filtrate will vary depending on whether or not, and how much of, the condensed hydrocarbon vapors have been combined with it. This filtrate comprises the waxy feed for the hydroisomerization in the process of the invention, and may or may not be flashed or fractionated to increase the amount of 650–750° F.+ waxy hydrocarbon content in the feed prior to hydroisomerization. Slurry hydrocarbon synthesis process conditions vary somewhat depending on the catalyst and desired products. Typical conditions effective to form hydrocarbons comprising mostly $C_{5+}$ paraffins, (e.g., $C_{5+}$–$C_{200}$) and preferably $C_{10+}$ paraffins, in a slurry hydrocarbon synthesis process employing a catalyst comprising a supported cobalt component include, for example, temperatures, pressures and hourly gas space velocities in the range of from about 320–600° F., 80–600 psi and 100–40,000 V/hr/V, expressed as standard volumes of the gaseous CO and $H_2$ mixture (0° C., 1 atm) per hour per volume of catalyst, respectively. In the practice of the invention, it is preferred that the hydrocarbon synthesis reaction be conducted under conditions in which little or no water gas shift reaction occurs and more preferably with no water gas shift reaction occurring during the hydrocarbon synthesis. It is also preferred to conduct the reaction under conditions to achieve an alpha of at least 0.85, preferably at least 0.9 and more preferably at least 0.92, so as to synthesize more of the more desirable higher molecular weight hydrocarbons. This has been achieved in a slurry process using a catalyst containing a catalytic cobalt component. Those skilled in the art know that by alpha is meant the Schultz-Flory kinetic alpha. While suitable Fischer-Tropsch reaction types of catalyst comprise, for example, one or more Group VIII catalytic metals such as Fe, Ni, Co, Ru and Re, it is preferred in the process of the invention that the catalyst comprise a cobalt catalytic component. In one embodiment the catalyst comprises catalytically effective amounts of Co and one or more of Re, Ru, Fe, Ni, Th, Zr, Hf, U, Mg and La on a suitable inorganic support material, preferably one which comprises one or more refractory metal oxides. Preferred supports for Co containing catalysts comprise titania, particularly. Useful catalysts and their preparation are known and illustrative, but non-limiting examples may be found, for example, in U.S. Pat. Nos. 4,568,663; 4,663,305; 4,542,122; 4,621,072 and 5,545,674. The waxy hydrocarbon liquid removed from the slurry reactor comprises at least about 95 wt. % and typically at least 98 wt. % paraffins, most of which are normal paraffins. It contains contain less than 1 wppm sulfur, less than 1 wppm nitrogen less than 2,000, preferably less than 1,000 and more preferably less than 500 wppm oxygen in the form of oxygenates and less than 0.5 wt. % aromatics.

The invention will be further understood with reference to the examples below.

EXAMPLES

Example 1

A Fischer-Tropsch synthesized waxy feed was formed from a synthesis gas feed comprising a mixture of $H_2$ and CO having a mole ratio of between 2.11–2.16 which was reacted in a slurry comprising bubbles of the synthesis gas and particles of a Fischer-Tropsch hydrocarbon synthesis catalyst comprising cobalt and rhenium supported on titania dispersed in the hydrocarbon slurry liquid. The slurry liquid comprised hydrocarbon products of the synthesis reaction which were liquid at the reaction conditions. These included a temperature of 425° F., a pressure of 290 psig and a gas feed linear velocity of from 12 to 18 cm/sec. The alpha of the synthesis step was greater than 0.9. A 700° F.+ boiling fraction was separated from the reactor by filtration. The boiling point distribution of this fraction, which was the waxy feed for the hydroisomerization reaction, is given in Table 1. Although it is liquid at the hydrocarbon synthesis conditions, this material is a solid, waxy material at standard conditions of room temperature and pressure, which is why it is commonly referred to as wax by those skilled in the art.

TABLE 1

| Wt. % Boiling Point Distribution of Fischer-Tropsch Synthesized Waxy Feed | |
|---|---|
| IBP–500° F. | 1.0 |
| 500–700° F. | 28.1 |
| 700° F.+ | 70.9 |
| (1050° F.+) | (6.8) |

Example 2

The waxy feed produced in Example 1 was hydroisomerized without prior fractionation. This feed comprised the entire product shown in Table 1, including the 29 wt. % of material boiling below 700° F. The wax was hydroisomerized by reacting with hydrogen in the presence of a dual function hydroisomerization catalyst which consisted of cobalt (3.6 wt. % as CoO), molybdenum (16.4 wt. % as $MoO_3$), and nickel (0.66 wt. % as NiO) on a surface silica modified, amorphous silica-alumina cogel acidic support containing 13.6 wt. % $SiO_2$. The catalyst had a surface area of 266 m²/g and a pore volume <30 nm of 0.42. The preparation of this catalyst is described in detail in U.S. Pat. No. 5,187,138. The conditions of the hydroisomerization reaction are set forth in Table 2 and were selected for a target of from 30–80 wt. % conversion of the 700° F.+ fraction in the waxy feed. This conversion is defined as:

700° F.+ Conv.=[1−(wt. % 700° F.+ in product)/(wt. % 700° F.+ in feed)]×100

TABLE 2

| Hydroisomerization Reaction Conditions | | | | |
|---|---|---|---|---|
| 700° F.+ Conversion, wt. % | 30 | 50 | 67 | 80 |
| Temperature, ° F. (° C.) | 682 | 702 | 707 | 711 |
| LHSV, v/v/h | 0.42 | 0.45 | 0.43 | 0.43 |
| $H_2$ Pressure, psig (pure) | 1000 | 1000 | 1000 | 1000 |
| $H_2$ Treat Gas Rate, SCF/B | 2500 | 2500 | 2500 | 2500 |

Thus, during the hydroisomerization the entire feed was hydroisomerized, with from 30–80 wt. % of the 700° F.+ fraction converted to 700° F.− boiling products. The hydroisomerate was fractionated into 700° F.− fuel products of reduced cloud point and freeze point and a waxy 700° F.+ fraction. The waxy 700° F.+ hydroisomerate was then fractionated into various lubricant viscosity grades using a HIVAC distillation. A portion of each fraction was solvent dewaxed to compare the properties of the dewaxed oil with those of the undewaxed oil which is the base stock of the invention. The dewaxing conditions are shown in Table 3, while the properties for both the waxy lubricants and the dewaxed oils for the 100 N and 175 N viscosity grades are listed in Table 4 and 5, respectively.

TABLE 3

| Dewaxing Conditions | | |
|---|---|---|
| | Viscosity Grade | |
| | 100 N | 175 N |
| 30% Conversion | | |
| Solvent:Oil Ratio | 3:1 | 3:1 |
| Filter Temp., ° C. | −21 | −21 |
| Pour Pt., ° C. | −18 | −18 |
| 50% Conversion | | |
| Solvent:Oil Ratio | 3:1 | 3:1 |
| Filter Temp., ° C. | −21 | −21 |
| Pour Pt., ° C. | −21 | −21 |
| 67% Conversion | | |
| Solvent:Oil Ratio | 3:1 | 3:1 |
| Filter Temp., ° C. | −21 | −21 |
| Pour Pt., ° C. | −15 | −18 |
| 80% Conversion | | |
| Solvent:Oil Ratio | 3:1 | 3:1 |
| Filter Temp., ° C. | −21 | −21 |
| Pour Pt., ° C. | −24 | −24 |

TABLE 4

Properties for 100 N Base Stocks

| 700° F.+ Conversion | 30 | | 50 | | 67 | | 80 | |
|---|---|---|---|---|---|---|---|---|
| Dewaxed | N | Y | N | Y | N | Y | N | Y |
| Viscosity @ 40° C., cSt | 15.23 | 15.59 | 16.04 | 16.28 | 15.81 | 15.9 | 16.60 | 16.71 |
| Viscosity @ 100° C., cSt | 3.80 | 3.81 | 3.84 | 3.86 | 3.78 | 3.77 | 3.84 | 3.85 |
| Viscosity Index | 147 | 141 | 137 | 133 | 132 | 129 | 126 | 124 |
| Pour Point, ° C. | >20 | −18 | 15 | −21 | 3 | −15 | −6 | −24 |
| Cloud Point, ° C. | >20 | −14 | 19 | −14 | 16 | −7 | 3 | −21 |

TABLE 5

Properties for 175 N Base Stocks

| 700° F.+ Conversion | 30 | | 50 | | 67 | | 80 | |
|---|---|---|---|---|---|---|---|---|
| Dewaxed | N | Y | N | Y | N | Y | N | Y |
| Viscosity @ 40° C., cSt | n.m. | 26.96 | 29.05 | 29.14 | 28.79 | 28.76 | 29.67 | 28.94 |
| Viscosity @ 100° C., cSt | 5.63 | 5.59 | 5.81 | 5.77 | 5.70 | 5.68 | 5.70 | 5.61 |
| Viscosity Index | — | 153 | 148 | 145 | 143 | 143 | 136 | 136 |
| Pour Point, ° C. | >20 | −18 | >20 | −21 | 21 | −18 | −6 | −24 |
| Cloud Point, ° C. | >20 | −14 | >20 | −17 | >20 | −14 | 12 | −21 |

Example 3

Each additive package referred to below, which was added to the base stocks to form a fully formulated lube oil contained, in addition to a plurality of other additives, a polymethyl methacrylate. Polymethyl methacrylates are known to possess pour point depressing activity.

Fully formulated lubricating oils were prepared by adding the appropriate additive package to each of the dewaxed base stocks and the undewaxed base stocks of the invention. The same additive packages were added to base stocks derived from conventional mineral oil and PAO of the same viscosity grade. For the automatic transmission formulated oils, an additive package meeting the 1989 Canadian Automatic Transmission Fluid Formulation specifications was used at 13 volume % of additive package to 87 volume % of the base stock and another additive package meeting the 1991 USA Automatic Transmission oil Formulation specifications was used at 11 volume % of additive package to 89 volume % of base stock. The low temperature performance of the 100 N base stocks was evaluated with these two different automatic transmission fluid (ATF) formulations. The results of these formulations are shown in Table 6. For ATFs, a Brookfield viscosity of 10,000 cP maximum at −40° C. is the critical specification to meet. The Brookfield viscosity results shown in Table 6 are surprising and unexpected for the waxy 100 N base stocks prepared at 80% conversion. These data show that this base stock, with a natural waxy pour point of −6° C., can readily be pour point depressed to below −51° C. More surprisingly though, is the finding that the ATF Brookfield viscosities for the waxy base stocks are equivalent to that for the corresponding dewaxed base stocks. Based on these data, it is clear that the base stock prepared at 80% conversion does not require dewaxing. These data are corroborated by the data in Table 7 below for Example 4, which shows that the base stock prepared at 67% and 80% conversion exhibit acceptable low temperature properties and do not require dewaxing to meet critical low temperature performance.

Next the low temperature performance for the 100 N base stocks was evaluated for low temperature performance in an SAE 5W-30 passenger car (crankcase) motor oil (PCMO) formulation, again using the synthetic base stocks derived from the Fischer-Tropsch synthesized waxy hydrocarbon feed, the PAO oil and the mineral derived oil. For SAE 5W-30 PCMO's, three critical specifications are (i) a maximum Cold Cranking Simulator Viscosity (CCS) at −25° C. of 35.0 P; (ii) a maximum Slow Cool Mini Rotary Viscosity (SCMRV) at −30 ° C. of 300 P; (iii) a maximum Borderline Pumping Temperature (BPT) of −30° C. The results are shown in Table 7 below which, as mentioned above, corroborate the results in Table 6 for the ATF oils.

The low temperature properties of the 175 N base stocks were evaluated in a hydraulic oil formulation and in a multigrade, SAE 5W-50 passenger car motor oil (PCMO) formulation. The results for these full formulated oils formulated oils are shown on Tables 8 and 9 which also show that the base stocks prepared at 80% conversion do not require dewaxing to meet critical low temperature properties.

TABLE 6

100N Automatic Transmission Fluid Formulations Properties
Automatic Transmission Fluid Formulation #1

| Base Stock | 30 | 50 | | 67 | | 80 | | PAO | Mineral Oil | Prod. |
|---|---|---|---|---|---|---|---|---|---|---|
| | | | | 700° F.+ Conversion | | | | | | |
| Dewaxed | Y | Y | N | Y | N | Y | N | N | Y | Spec. |
| Viscosity @ 100° C., cSt | 7.20 | 7.28 | n.m | 6.98 | n.m | 6.95 | 7.27 | 7.15 | 7.60 | ca. 7.5 |
| Pour Point, ° C. | −45 | <−51 | +9 | <−51 | −21 | <−51 | <−51 | <−54 | −51 | |
| Cloud Point, ° C. | −18 | −19 | n.m. | −9 | +14 | −26 | +1 | <−54 | −19 | |
| Brookfield Viscosity at −40° C., cP | 25,500 | 7,660 | solid | 6,500 | solid | 5,160 | 5,820 | 3,610 | 16,600 | 10,000 max. |
| Viscosity @ 100° C., cSt | | 6.62 | | 6.52 | | 6.64 | 6.55 | 6.48 | | ca. 7.4 |
| Pour Point, ° C. | | <−51 | | <−51 | | <−51 | <−51 | <−51 | | |
| Cloud Point, ° C. | | −18 | | −9 | | −25 | +1 | <−51 | | |
| Brookfield Viscosity at −40° C., cP | | 5,910 | | 5,500 | | 5,170 | 5,580 | 3,290 | | 10,000 max. |
| Viscosity @ 100° C., cSt | 7.20 | 7.28 | n.m | 6.98 | n.m | 6.95 | 7.27 | 7.15 | 7.60 | ca. 7.5 |
| Pour Point, ° C. | −45 | <−51 | +9 | <−51 | −21 | <−51 | <−51 | <−54 | −51 | |
| Cloud Point, ° C. | −18 | −19 | n.m. | −9 | +14 | −26 | +1 | <−54 | −19 | |
| Brookfield Viscosity at −40° C., cP | 25,500 | 7,660 | solid | 6,500 | solid | 5,160 | 5,820 | 3,610 | 16,600 | 10,000 max. |
| Viscosity @ 100° C., cSt | | 6.62 | | 6.52 | | 6.64 | 6.55 | 6.48 | | ca. 7.4 |
| Pour Point, ° C. | | <−51 | | <−51 | | <−51 | <−51 | <−51 | | |
| Cloud Point, ° C. | | −18 | | −9 | | −25 | +1 | <−51 | | |
| Brookfield Viscosity at −40° C., cP | | 5,910 | | 5,500 | | 5,170 | 5,580 | 3,290 | | 10,000 max. |

TABLE 7

100N SAE 5W-30 Passenger Car Motor Oil Formulation Properties

| Base Stock | 30 | 50 | 67 | | 80 | | PAO | Mineral Oil | Prod. |
|---|---|---|---|---|---|---|---|---|---|
| | | | 700° F.+ Conversion | | | | | | |
| Dewaxed | Y | Y | Y | N | Y | N | N | Y | Spec. |
| Viscosity @ 100° C., cSt | 10.89 | 10.90 | 10.84 | 10.88 | 10.99 | 10.93 | 10.90 | 11.11 | 9.3–12.5 |
| Pour Point, ° C. | −45 | −45 | −45 | −48 | −45 | −48 | <−54 | −42 | −42 max. |
| CCS @ −25° C., P (1) | 30.0 | 30.8 | 30.7 | 33.1 | 31.1 | 30.8 | 28.8 | 36.2 | 35.0 max. |
| SCMRV at −30° C., P (2) | 81.2 | 68.8 | 63.6 | 124.7 | 72.9 | 69.9 | 68.5 | 93.2 | 300 max. |
| MRV at −30° C., P (3) | 66.6 | 70.4 | 69.6 | 70.8 | 74.5 | 69.9 | 67.5 | 91.5 | 300 max. |
| BPT, ° C. (4) | −36.9 | −38.6 | −38.5 | −38.7 | −38.9 | −38.7 | −38.3 | −37.3 | −30 max. |
| Viscosity @ 100° C., cSt | 10.89 | 10.90 | 10.84 | 10.88 | 10.99 | 10.93 | 10.90 | 11.11 | 9.3–12.5 |
| Pour Point, ° C. | −45 | −45 | −45 | −48 | −45 | −48 | <−54 | −42 | −42 max. |
| CCS @ −25° C., P (1) | 30.0 | 30.8 | 30.7 | 33.1 | 31.1 | 30.8 | 28.8 | 36.2 | 35.0 max. |
| SCMRV at −30° C., P (2) | 81.2 | 68.8 | 63.6 | 124.7 | 72.9 | 69.9 | 68.5 | 93.2 | 300 max. |
| MRV at −30° C., P (3) | 66.6 | 70.4 | 69.6 | 70.8 | 74.5 | 69.9 | 67.5 | 91.5 | 300 max. |
| BPT, ° C. (4) | −36.9 | −38.6 | −38.5 | −38.7 | −38.9 | −38.7 | −38.3 | −37.3 | −30 max. |

(1) Cold Cranking Simulator Viscosity
(2) Slow Cool Mini Rotary Viscosity
(3) Mini Rotary Viscosity
(4) Borderline Pumping Temperature

TABLE 8

175N Hydraulic Oil Formulation Properties

| Base Stock | 30 | 50 | 67 | 80 | | PAO | Prod. |
|---|---|---|---|---|---|---|---|
| | | | 700° F.+ Conversion | | | | |
| Dewaxed | Y | Y | Y | Y | N | N | Spec. |
| Viscosity at 100° C., cSt | 10.29 | 10.64 | 10.47 | 10.42 | 10.56 | 10.80 | ca. 10.4 |
| Viscosity at 40° C., cSt | 52.93 | 57.23 | 57.15 | 57.82 | 58.42 | 59.26 | 65–71 |
| Viscosity Index | 187 | 179 | 175 | 171 | 173 | 176 | 130 min. |
| Pour Point, ° C. | −27 | −39 | −42 | −45 | −45 | −42 | −36 max. |

TABLE 8-continued

175N Hydraulic Oil Formulation Properties

700° F.+ Conversion

| Base Stock | 30 | 50 | 67 | 80 | | PAO | Prod. |
|---|---|---|---|---|---|---|---|
| Dewaxed | Y | Y | Y | Y | N | N | Spec. |
| Brookfield Viscosity, cP | | | | | | | |
| at −20° C. | 2,150 | 2,310 | 2,400 | 2,380 | 2,600 | 2,530 | 8000 max. |
| at −35° C. | 50,300 | 26,600 | 17,220 | 15,440 | 17,260 | 23,950 | — |

TABLE 9

175N SAE 5W-50 Passenger Car Motor Oil Formulation Properties

700° F.+ Conversion

| Base Stock | 30 | 50 | 67 | 80 | | PAO | Prod. |
|---|---|---|---|---|---|---|---|
| Dewaxed | Y | Y | Y | Y | N | N | Spec. |
| Viscosity at 100° C., cSt | 16.88 | 17.99 | 17.20 | 17.20 | 17.87 | 18.36 | 16.3–21.9 |
| Pour Point, ° C. | −39 | −39 | −39 | −48 | −42 | −48 | −39 max. |
| CCS Viscosity at −25° C., cP | 33.1 | 30.2 | 32.8 | 32.0 | 34.6 | 26.2 | 35.0 max. |
| SCMRV at −30° C., P | 191.2 | 92.0 | 89.1 | 84.8 | 98.0 | 68.9 | 300 max. |

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for producing an isoparaffinic lubricant base stock which comprises hydroisomerizing a waxy, paraffinic, Fischer-Tropsch synthesized hydrocarbon feed comprising 650–750° F.+ hydrocarbons, by reacting said feed with hydrogen in the presence of a hydroisomerization catalyst comprising a Group VIII non-noble catalytic component and an acidic carrier component comprising amorphous silica-alumina, said hydroisomerization conducted at a conversion level of said 650–750° F.+ feed hydrocarbons sufficient to produce a 650–750° F.+ hydroisomerate base stock which comprises said base stock which does not require dewaxing.

2. A process according to claim 1 wherein said feed conversion level is at least 60 wt. %.

3. A process according to claim 2 wherein said lubricant base stock comprises all or a fraction of said 650–750° F.+ hydroisomerate.

4. A process according to claim 3 wherein said catalyst also contains a Group VIB metal catalytic component.

5. A process according to claim 4 wherein said silica-alumina component contains less than 50 wt. % silica.

6. A process according to claim 5 wherein said feed conversion level is at least 67 wt. %.

7. A process according to claim 6 wherein at least one lubricant additive is combined with said base stock.

8. A process according to claim 7 wherein said lubricant is combined with a lubricant additive package containing more than one lubricant additive, said additive package selected from the group consisting of an internal combustion engine crankcase oil additive package, an automatic transmission oil additive package, a turbine or jet oil additive package, a hydraulic oil additive package and an industrial oil additive package.

9. A process according to claim 8 wherein said base stock is combined with a multigrade internal combustion engine crankcase oil additive package.

10. A process according to claim 4 wherein said catalyst contains a cobalt and a molybdenum catalytic component.

11. A process according to claim 10 wherein said amorphous silica-alumina comprises less than 35 wt. % silica.

12. A process according to claim 11 wherein said lubricant is combined with a lubricant additive package containing more than one lubricant additive, said additive package selected from the group consisting of an internal combustion engine crankcase oil additive package, an automatic transmission oil additive package, a turbine or jet oil additive package, a hydraulic oil additive package and an industrial oil additive package.

13. A process according to claim 12 wherein said base stock is combined with a multigrade internal combustion engine crankcase oil additive package.

14. A process for producing an isoparaffinic lubricant base stock which comprises hydroisomerizing a waxy, paraffinic, Fischer-Tropsch synthesized hydrocarbon feed comprising 650–750° F.+ hydrocarbons, by reacting said feed with hydrogen in the presence of a hydroisomerization catalyst having both a hydrogenation/dehydrogenation function and an acid hydrocracking function and comprising a Group VIII non-noble metal catalytic component, a Group VIB metal catalytic component, and an acidic carrier component comprising amorphous silica-alumina containing less than 50 wt. % silica, said hydroisomerization conducted at a conversion level of said 650–750° F.+ feed hydrocarbons sufficient to produce a hydroisomerate which comprises said base stock, wherein said base stock does not require dewaxing.

15. A process according to claim 14 wherein said feed conversion level is at least 60 wt. %.

16. A process according to claim 15 wherein said hydroisomerate comprises a 650–750° F.+ fraction, of which said base stock comprises all or a fraction.

17. A process according to claim 16 wherein said base stock comprises at least 95 wt. % non-cyclic isoparaffins.

18. A process according to claim 17 wherein said silica-alumina component contains less than 35 wt. % silica.

19. A process according to claim 18 wherein said catalyst comprises cobalt and molybdenum catalytic metal components.

20. A process according to claim 19 wherein said feed conversion level is at least 67 wt. %.

21. A process according to claim 20 wherein at least one lubricant additive is combined with said base stock.

22. A process according to claim 21 wherein said catalyst also comprises a Group IB metal component for suppressing hydrogenolysis.

23. A process according to claim 22 wherein said lubricant is combined with a lubricant additive package containing more than one lubricant additive, said additive package selected from the group consisting of an internal combustion engine crankcase oil additive package, an automatic transmission oil additive package, a turbine or jet oil additive package, a hydraulic oil additive package and an industrial oil additive package.

24. A process according to claim 13 wherein said cobalt component, calculated as CoO, comprises from 2–5 wt. % of said catalyst and said molybdenum component, calculated as $MoO_3$, comprises from 10–20 wt. % of said catalyst.

25. A process according to claim 24 wherein said Fischer-Tropsch synthesized paraffinic feed is produced by a slurry Fischer-Tropsch process employing a catalyst comprising a cobalt catalytic component.

* * * * *